Jan. 8, 1963 M. BODIAN 3,072,374
MOVABLE ARM FOR EXAMINATION LIGHT
Filed Sept. 19, 1960 2 Sheets-Sheet 1
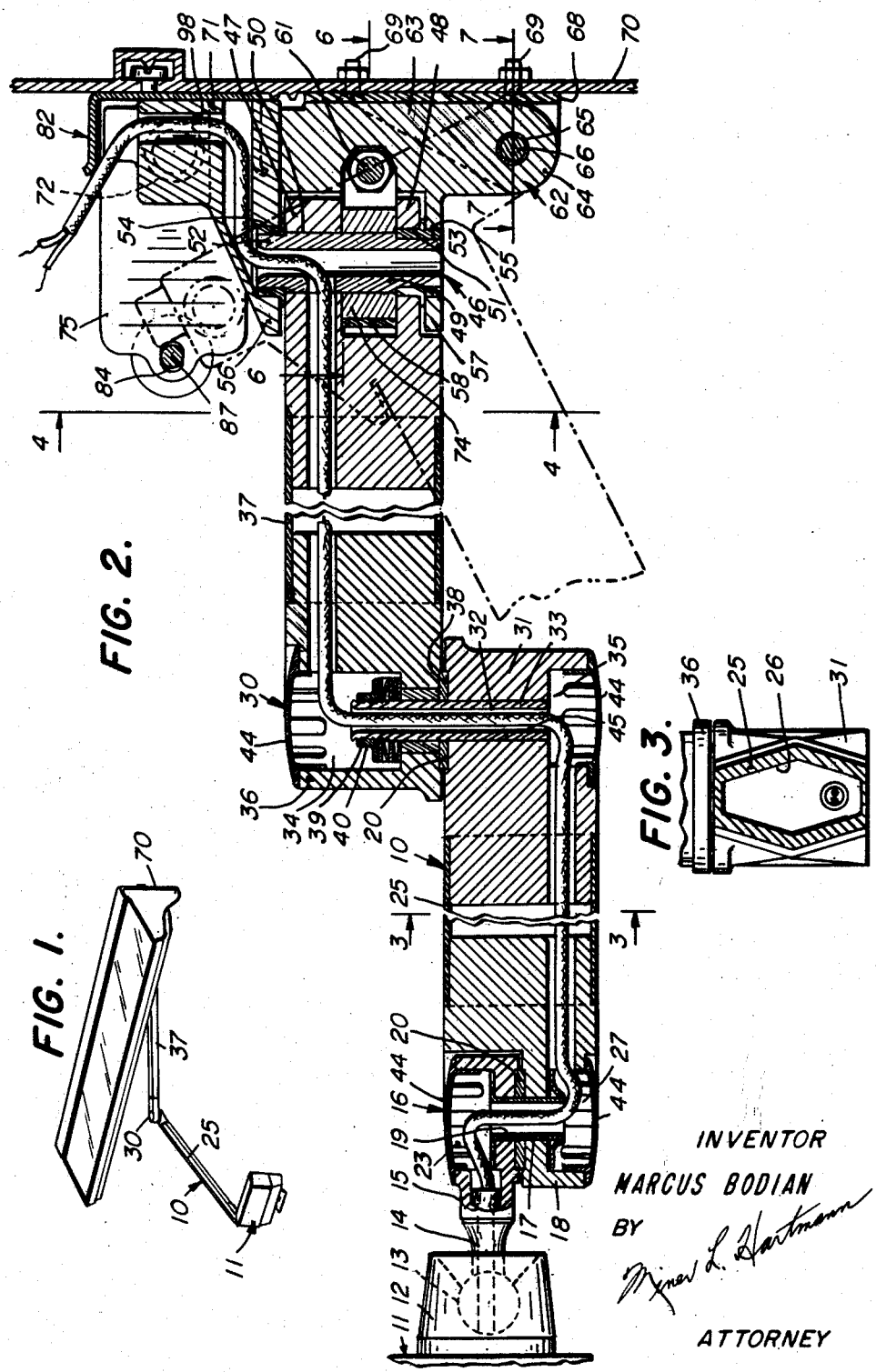
INVENTOR
MARCUS BODIAN
BY
ATTORNEY Jan. 8, 1963 M. BODIAN 3,072,374
MOVABLE ARM FOR EXAMINATION LIGHT
Filed Sept. 19, 1960 2 Sheets-Sheet 2

INVENTOR
MARCUS BODIAN
BY
ATTORNEY

United States Patent Office 3,072,374
Patented Jan. 8, 1963

3,072,374
MOVABLE ARM FOR EXAMINATION LIGHT
Marcus Bodian, Los Angeles, Calif., assignor to Sunbeam Lighting Company, Los Angeles, Calif., a firm
Filed Sept. 19, 1960, Ser. No. 56,994
4 Claims. (Cl. 248—278)

This invention relates to a movable arm for an examination light, and in particular to a universal extensible arm for positioning and maintaining an examination light in any selected position.

One object of the invention is to provide an extensible arm for holding an examination light in any desired extended position. Another object is to provide an extensible universal arm for holding a spot light. Still another object is to provide a rectilinear clutch device for maintaining a supporting arm in a desired angular position. A further object is to provide a universal extensible arm having pivot joints, through which arm and pivot joints the flexible electrical conductors may be inserted. A still further object is to provide a rectilinear clutch device for a universal extensible supporting arm for an examination light or the like.

These and other objects are attained by my invention which will be understood from the following description, reference being made to the accompanying drawings in which FIG. 1 is a perspective view showing the movable arm of this invention supporting an examination light;

FIG. 2 is a longitudinal cross-sectional view of a preferred form of the universal extensible arm of this invention;

FIG. 3 is a cross-sectional view taken on the line 3—3 of FIG. 2;

Figure 4:
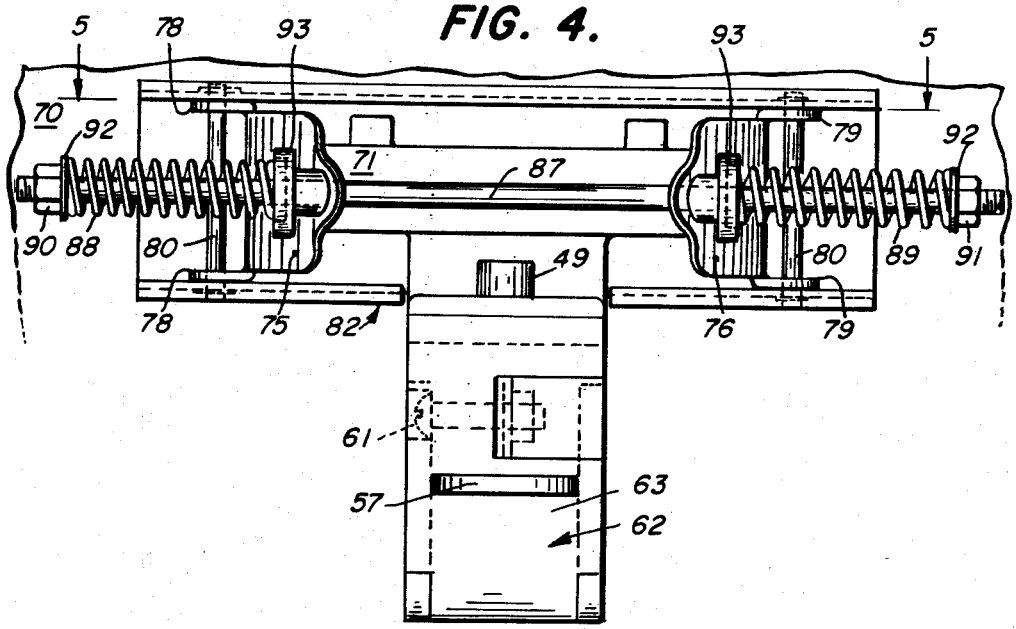
FIG. 4 is a front elevation view taken from the position of line 4—4 of FIG. 2 with the arm portion removed.
Figure 5:
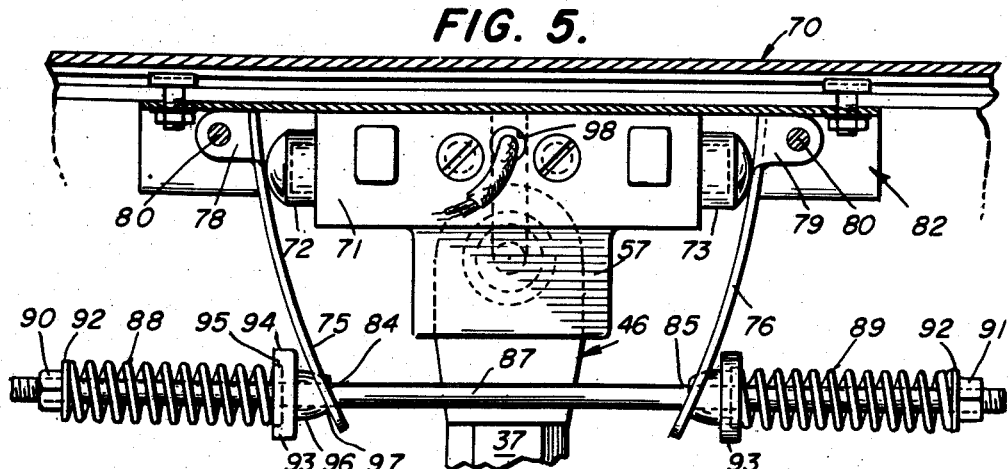
FIG. 5 is a plan view of the rectilinear clutch means taken from the position 5—5 of FIG. 4.
Figures 6, 7:
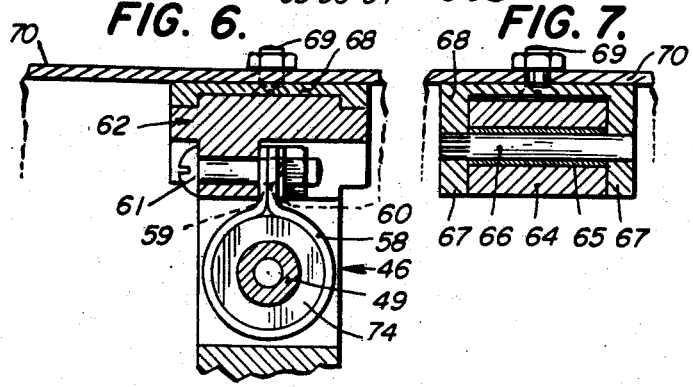
FIG. 6 is a cross-sectional view taken on the line 6—6 of FIG. 2.
FIG. 7 is a cross-sectional view taken on the line 7—7 of FIG. 2.

The universal extensible supporting arm means of this invention consists in general of a series of pivot joints with intervening arm portions and at the fixed mounting end a clutch means for a hinge and joint which frictionally fixes the elevation of the arm means and the supported examination light or the like. The particular use for the extensible arm means is to support a spot light or examination light from a wall-mounted hospital bed light base, one form of which is shown particularly in FIG. 1.

Referring to the drawings, the outer end portion 10 of the extensible arm means is attached to the examination light housing 11 by a swivel joint consisting of a swivel housing 12 enclosing a swivel ball 13, the stem 14 of the swivel ball being attached to or integral with the upper portion 15 of a first pivot joint 16. A first pivot pin 17 movably connects the upper portion 15 of the pivot joint to the lower portion 18, there being a friction washer 20 interposed between the sliding surfaces of the upper and lower portion 15 and 18 of the pivot joint. The pivot pin 17 is provided with an axial hole 19 through which the insulated electrical conductors may pass without interfering with the movement of the joint.

An elongated first or outer arm portion 25 is attached to or integral with the lower portion 18 of the first pivot joint 16, there being a cavity 26 extending lengthwise of the arm to receive the electrical conductors, with openings positioned adjacent the respective pivot pins of the first pivot joint 16 and the second pivot joint 30.

The second pivot joint 30 consists of a lower pivot head 31 which is attached to or integral with the elongated first arm 25. The lower pivot head is provided with a pivot pin hole 32 in which is rigidly mounted the second pivot pin 33 which extends into the cavity 34 of the upper pivot head 36 of the second pivot joint 30 which is connected to the second elongated arm 37. A friction washer 20 is provided between the contacting surfaces on the upper face 38 of the lower pivot head 31 and the lower face of the upper pivot head 36, this washer being disposed around the second pivot pin 33. The second pivot pin 33 is provided with threads 39 on its upper end on which the nut 40 is affixed, there being a plurality of dished washer springs between the nut and the bottom of the cavity 34 in the upper pivot head 36.

Frictionally engaged closure caps 44 are provided for the open cavities 23, 27, 34 and 35 of the pivot heads. An axial hole 45 is provided through the second pivot pin 33 including corresponding holes in the nut 40 to provide and opening for containing the electrical conductors without interference in the pivot action of the joint.

Other similar frictional pivot joints may be interposed between the second pivot joint 30 and the clutch means which will be described below, in order to give the desired length and foldability of the extensible arm.

The terminal or inner arm portion, which may be the second elongated arm 37 or an equivalent arm portion if additional spring tension pivot joints are interposed, terminates in a third pivot joint 46 which in the preferred structure and as shown has spaced apart upper pivot boss 47 and lower pivot boss 48 extending toward the clutch base 62 with a third pivot pin 49 rigidly affixed in the pivot pin holes 50 and 51. The upper and lower ends 52 and 53 of the pivot pin 49 are engaged in holes 54 and 55, in the pivot bosses 56 and 57 of the clutch base 62. A friction band 58 is carried around a metal collar 74 attached intermediate the ends of the third pivot 49, the opposed ends of the band being bent out radially and provided with holes 59 and 60 which are engaged by the adjusting bolt 61 which is mounted in the clutch base 62 whereby the turning friction on the third pivot may be adjusted.

The clutch base 62 consists of a body member 63 from the central portion of which protrudes the upper and lower pivot bosses 56 and 57. At one end of the clutch base 62 is provided a pivot tab 64 having a pivot bushing 65 which is adapted to receive the hinge pin 66 which is non-rotatively mounted on spaced apart brackets 67 integral with a hinge base 68 which is attached by screws 69 to a rigid structural member 70. At the end of the body member 63 opposite the hinge pin 66 is provided a clutch arm 71 which is disposed in position substantially parallel to the hinge pin 66. At opposite ends of the clutch arm 71 are provided nylon friction buttons 72 and 73 each of which frictionally engages a curved clutch plate, 75 and 76 respectively, the said plates being pivotally mounted at their inner ends by tabs 78 and 79 mounted on pivot pins 80 which are supported across the channel structural member 82, which channel member in turn is attached to the structural member 70 for the whole arm and clutch structure. The outer ends of the clutch plates 78 and 79 are provided with holes 84 and 85 respectively, in which is mounted a tension connecting rod 87, there being coil compression springs 88 and 89 held by nuts 90 and 91, with washers 92 abutting the outer ends of the springs. The opposite or inner ends of the springs adjacent the holes 84 and 85 press upon the clutch plates 75 and 76, there being provided between each spring end and the corresponding clutch plate a wear-resisting contact button 93. The contact button is preferably made of nylon and is tapered down from a large sized base 94 having a recess 95 adapted to receive the inner end of the coil springs 88 and 89, the contact end 96 of the contact button 93 being reduced to a small rounded nose 97 which makes contact with the margins of the holes 84 and 85 in the clutch plates 75 and 76.

The third pivot pin 49 of the pivot joint between the clutch base 62 and the second elongated arm portion 37 is provided with an opening for the electrical conductors which pass through the arms, and exit through an opening 98 in the clutch arm 71.

It will be clear that the friction in the pivot joints may be varied as desired by tightening the nuts which hold the pivot pins in place, or by tightening the friction band 58 on the collar 74 attached to the third pivot pin 49, and likewise friction in the rectilinear friction clutch device may be varied by changing the tension on the coil springs 88 and 89 by means of the tensioning nuts 90 and 91 on the threaded ends of the tension rod 87. It has been found that the friction between the nylon buttons 72 and 73 and the properly curved clutch plates 75 and 76 is substantially constant regardless of the angle of elevation of the arm and that with the proper adjustment of the tension on the springs the arm will be frictionally fixed at any desired angular position. The arm means may be readily moved to any other selected position where the friction will again hold the arm means at the desired angle. The necessary friction will also depend upon the weight of the arm and the inspection light or other objects supported at the outer end of the universal arm means.

The objects of the invention as stated at the beginning of this specification, have been attained.

I claim:

1. A universal extensible supporting arm means for an examination light housing or the like comprising in combination an outer arm portion having swivel means for attachment to an examination light housing at the free end, and a first friction pivot connection at the other end; a second arm portion operatively attached at one end to said first friction pivot connection, and to a second friction pivot connection at its other end; an inner arm portion operatively attached at one end to said second friction pivot connection, and to a third friction pivot connection at its other end; and a rectilinear friction clutch device having said third friction pivot mounted at one end, and having adjacent thereto a hinged base disposed with the hinge pin axis at right angles to the axis of said third pivot connector, said hinged base being hingedly attached to a fixed structural member adapted to support said arm means.

2. A universal extensible supporting arm means for an examination light housing or the like comprising in combination an outer arm portion having swivel means for attachment to an examination light housing at the free end, and a first friction pivot connection at the other end; a second arm portion operatively attached at one end to said first friction pivot connection, and to a second friction pivot connection at its other end; a third arm portion operatively attached at one end to said second friction pivot connection, and to a third friction pivot connection at its other end; and a rectilinear clutch means having said third friction pivot mounted at one end, and having adjacent thereto a hinged base disposed with the hinge pin axis at right angle to the pivot connector axis, said hinged base being hingedly attached to a fixed structural member adapted to support said arm means, and a rectilinear friction clutch means for maintaining the arm means at any desired angular elevation, said rectilinear clutch means comprising a clutch arm attached to said hinged base, friction buttons attached to the opposite ends of said clutch arm, spaced apart curved friction plates pivotally mounted on said fixed structural member and disposed to make frictional contact with said friction buttons, and spring means operatively attached to said friction plates to press them against said buttons.

3. The universal extensible supporting arm means defined in claim 1, in which said arm portions and said pivot joints are provided with openings therethrough for the concealed passage of electrical conductors.

4. In a universal extensible supporting arm means for an examination electric light extending forwardly from a fixed structural member and having arm portions connected together with friction pivot joints: a hinge joint between said structural member and the inner arm portion of said arm means for angular elevation of said arm portion, and a rectilinear friction clutch means operatively disposed between the hinged members, said rectilinear friction clutch means comprising a clutch base connected to said inner arm portion, a clutch arm attached to said base, friction buttons attached to the opposite ends of said clutch arm, spaced apart curved friction plates pivotally mounted on said structural member, and disposed to make frictional contact with said friction buttons, and spring means operatively attached to said friction plates to press them against said buttons.

References Cited in the file of this patent

UNITED STATES PATENTS

| | | |
|---|---|---|
| 376,617 | Vance | Jan. 17, 1888 |
| 1,350,423 | Runkel | Aug. 24, 1920 |